Dec. 14, 1937.  S. C. LEONARD, JR  2,102,013
SEAL
Filed April 19, 1935
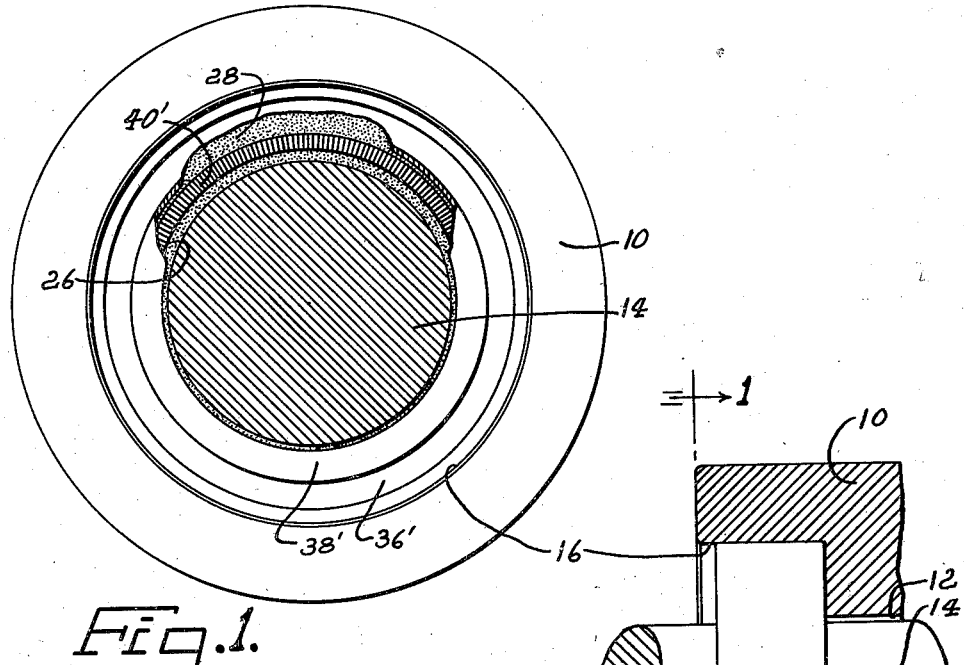
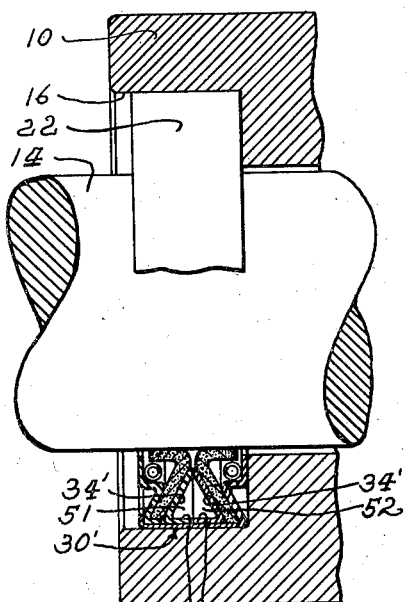
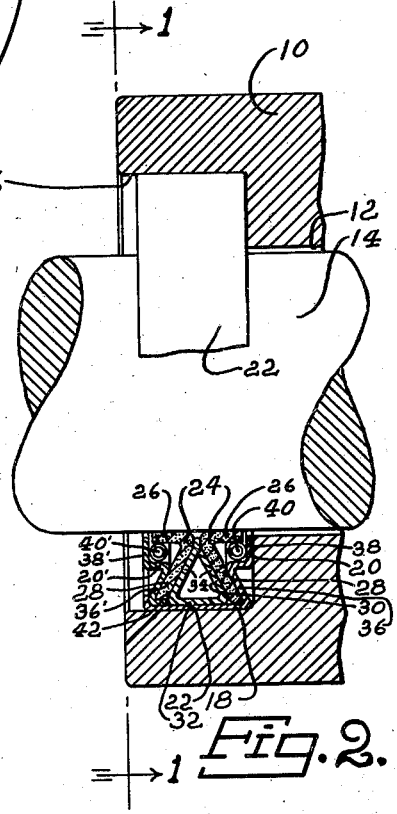
INVENTOR
SIMPSON C. LEONARD JR.
BY
*La Rue W. Patee*
ATTORNEY Patented Dec. 14, 1937

2,102,013

UNITED STATES PATENT OFFICE 2,102,013

SEAL

Simpson C. Leonard, Jr., Detroit, Mich., assignor to Michigan Leather Packing Company, Detroit, Mich., a corporation of Michigan Application April 19, 1935, Serial No. 17,195

2 Claims. (Cl. 288—1)

This invention relates to a lubricating seal of the type adapted to be used in a housing surrounding a rotatable shaft.

An object of the invention is to provide a seal which is inexpensive to manufacture and which may be constructed from a minimum number of parts.

A further object of the invention is to provide a seal having a pair of oppositely arranged pliable sealing rings securely positioned in a stamped shell.

Other objects and advantages of the invention will be more apparent from the following description taken in connection with the accompanying drawing, in which:

Fig. 1 is an end view of a seal taken on line 1—1 of Fig. 2.

Fig. 2 is a sectional view through a housing equipped with a seal embodying the invention, showing the seal partly in section and partly in side elevation.

Fig. 3 is a sectional view, similar to Fig. 2, but showing a modified form of the invention.

Referring to the drawing, I have shown a housing 10 provided with an annular opening 12 for the reception of a rotatable shaft 14. A recess 16 is provided in the end of the housing 10 for the reception of my improved sealing unit.

The sealing unit, in cross section, is substantially rectangular and comprises an outer housing 18 having an inner end wall 20 and an outer axially extending flange 22 constituting the inner annular wall of the unit. Within the wall 22 I have positioned a pair of angularly shaped sealing rings 24 arranged back to back. Each ring comprises an axially extending flange portion 26 and a flange 28 extending generally in a radial direction, the latter flange being directed at an inclination to the axial flange 26. The flanges 26 are positioned adjacent each other so that the flanges 28 diverge outwardly and are positioned a substantial distance from each other.

A triangularly shaped spacing ring 30 is positioned between the flanges 28. This ring is formed from sheet metal and comprises an outer axially extending flange portion 32 and radially and inwardly extending flange portions 34 which are in contact at the free ends thereof. The outer surface of the flange 28 of the inner sealing ring 24 is in direct contact with the inner surface of the end wall 20. A portion 36 of the end wall 20 is directed radially and outwardly in parallel arrangement with the flange 28 and the adjacent flange 34 of the spacing ring 32, thus retaining the flange 28 between the flanges 36 and 34. The portion 36 of the end wall is extended only part way of the flange 28 where it is bent outwardly in parallel arrangement with the outer wall 22 to a distance in radial alignment with the inner end of the outer housing, where it is flanged radially as at 38, providing a space for the reception of an endless coil spring 40 positioned about the outer periphery of the flange 26. On the opposite or the front wall of the sealing unit I have arranged a stamping corresponding generally in shape to the end wall 20 and which is positioned against the flange 28 of the other sealing ring 24. This stamping is provided with portions 38', 20' and 36' which correspond respectively to the portions 38, 20 and 36 of the inner wall of the housing. The outer end of this ring is bent into a flange 42 extending inwardly paralleling the outer wall 22 against which the outer end of the flange 28 of the sealing ring abuts.

The axially extending wall 32 of the triangular spacing member 30 is in contact with the outer wall 22 of the housing.

This unit comprising oppositely disposed sealing members is particularly adapted for use in forming a seal between the housing and shaft where it is desired to prevent seepage of any liquids or lubricants from one side to the other in either direction axially of the shaft.

The sealing unit illustrated in Fig. 3 is, in general, substantially identical to that shown in Figs. 1 and 2 and identical parts are correspondingly designated by the same numerals. In this form of the invention, however, a triangular spacing ring, generally designated by the numeral 30', comprises complementary sections 51 and 52 which are positioned between the flanges 28. Each ring section 51 and 52 includes an outer axially extending flange portion 32' and an inwardly extending flange portion 34'. The inner extremities of the flange portions 34' contact with each other and the adjacent extremities of the axially extending flange portions 32' are disposed in abutting relationship. The two part spacer ring structure is readily formable by simple dies and facilitates convenience in assembly of the parts of the unit while providing all of the advantages of the structure shown in the form of the invention illustrated in Figs. 1 and 2.

Various changes, including the size, shape and arrangement of parts, may be made without departing from the spirit of my invention and it is not my intention to limit its scope other than by the terms of the appended claims.

What I claim is:

1. As an article of manufacture a self-contained seal for application as an assembled unit to a housing in encompassing relation to a centrally located shaft, consisting of a centrally apertured sheet metal cup which is provided with an annular peripheral portion and substantially Z-shaped end walls, a pair of leather packings arranged within said cup each having an axially extending flange and a radially extending flange, said packings being arranged back to back with the axially extending flanges extending in opposite directions, and a triangular spacing member arranged between said radially extending flanges.

2. As an article of manufacture, a self-contained seal for application as an assembled unit to a housing in encompassing relation to a centrally located shaft, consisting of a centrally apertured sheet metal cup which is provided with an annular peripheral portion, end walls at the opposite ends of said peripheral portion each extending inwardly toward each other and then outwardly and axially and finally radially, leather packing members each having axially extending portions and angularly disposed flange portions extending parallel to the inwardly extending portions of said end walls, and a triangular spacing member between said packing members.

SIMPSON C. LEONARD, Jr.